United States Patent [19]

Beck et al.

[11] Patent Number: 5,319,885
[45] Date of Patent: Jun. 14, 1994

[54] MACHINE FOR MULTISTEP FINISHING OF CIRCULAR SAW BLADES

[75] Inventors: Ernst Beck, Maselheim; Fritz Riehlein; Peter Lenard, both of Biberach/Riss; Hans-Joachim Reimann, Dellmensingen, all of Fed. Rep. of Germany

[73] Assignee: Vollmer Werke Maschinenfabrik GmbH, Riss, Fed. Rep. of Germany

[21] Appl. No.: 956,485
[22] PCT Filed: Jun. 19, 1992
[86] PCT No.: PCT/EP92/01389
  § 371 Date: Jan. 5, 1993
  § 102(e) Date: Jan. 5, 1993
[87] PCT Pub. No.: WO93/00194
  PCT Pub. Date: Jan. 7, 1993

[30] Foreign Application Priority Data

Jun. 21, 1991 [DE] Fed. Rep. of Germany ........ 4120567

[51] Int. Cl.⁵ .................................................. B24B 49/00
[52] U.S. Cl. ................................... 51/165.77; 51/165.8; 51/165.9; 76/48
[58] Field of Search ............... 51/80 BS, 88, 89, 117, 51/118, 285, 238 T, 165 R, 165.77, 165.8, 165.81, 165.82, 165.9

[56] References Cited

U.S. PATENT DOCUMENTS

| 1,051,153 | 1/1913 | Nelson | 76/48 |
| 2,637,223 | 5/1953 | Gustin | 76/48 |
| 3,526,157 | 9/1970 | Rachal | 76/48 |

FOREIGN PATENT DOCUMENTS 0232717  12/1984  Japan .................................. 76/48

Primary Examiner—M. Rachuba
Attorney, Agent, or Firm—Woodard, Emhardt, Naughton, Moriarty & McNett

[57] ABSTRACT

The machine comprises a retainer member (28) for a saw blade (10) to be plugged on as well as two machining stations located diametrically opposite each other with respect to the retainer member (28). A grinding device (38, 58) each is disposed at the two machining stations. The grinding devices (38, 58) are controlled such that they act simultaneously on a tooth (12, 16) each of the saw blade (10). Furthermore, a clamping device (70) each is disposed at the two stations, and these clamping devices are controlled such that they simultaneously clamp the saw blade (10), respectively, before the grinding devices (38, 38) engage the saw blade (10).

3 Claims, 4 Drawing Sheets

MACHINE FOR MULTISTEP FINISHING OF CIRCULAR SAW BLADES

The invention relates to a machine for finishing circular saw blades in multiple steps, comprising
   a retainer member for a saw blade to be plugged on,
   a means for clamping the saw blade,
   two machining stations located diametrically opposite each other with respect to the retainer member and designed for carrying out different operations on teeth of the saw blade, and
   a feeder means adapted to rotate the saw blade stepwise.

In a known machine of this kind (DE 29 40 730 A1) a retainer means for a saw blade is disposed between a soldering device and a pair of flank grinders. For repair of a saw blade furnished with hard metal plates, first of all those teeth having a damaged hard metal plate are moved successively into the operating range of the soldering device to remove these hard metal plates. Subsequently, all the plate seats which have become free are subjected to further treatment by a seat grinder which is located diametrically opposite the soldering device, just like the flank grinders. This is followed by attaching new hard metal plates, again by means of the soldering device and, finally, these hard metal plates are ground by the two flank grinders at the tooth flanks and, if necessary, in a subsequent operating step at the tooth back as well. During all this, the saw blade always is clamped between two hydraulically operable clamping jaws directly adjacent the tooth on which the flank grinders are working.

It is the object of the invention to shorten the machining time of a saw blade whose teeth must be subjected to a plurality of successive grinding operations.

Starting from a machine of the kind described initially, this object is met, in accordance with the invention, in that
   a grinding device each is disposed at the two machining stations,
   the grinding devices are controlled such that they act simultaneously on a tooth each of the saw blade,
   a clamping device each is disposed at the two stations, and
   the clamping devices are controlled such that they simultaneously clamp the saw blade, respectively, before the grinding devices engage the saw blade.

In this manner all the teeth can be subjected to several grinding finishes in a single revolution of the saw blade, for example to grinding on the back of the tooth at one of the two machining stations and grinding at each of the two lateral flanks of the tooth at the opposite machining station. It proved to do no harm that in this way approximately half of all the teeth are ground at their tooth backs prior to having their flanks ground, whereas the order is inverted with the grinding finishes of the remaining teeth.

In a preferred embodiment of the invention the clamping devices are movable from an operative position in which they are ready to clamp the saw blade into an inoperative position in which the saw blade can be slipped on or withdrawn from the retainer member in axial direction. In this manner the exchange of the saw blade is greatly facilitated because, contrary to the way of proceeding thus far, it is not necessary to introduce the saw blade in its own plane between clamping jaws of a clamping device before the saw blade can be slipped on its retainer.

Conveniently, the clamping devices are adapted to be swung back and forth parallel to themselves between their operative and inoperative positions by a slewing device each.

The machine according to the invention prefereably is developed further in that
   one of the two grinding devices and the associated clamping device are disposed on a first common carriage whose distance from the diametrically opposed grinding device with its associated clamping device is variable in a diametral direction of the saw blade, and
   the diametrically opposed grinding device and its associated clamping device are disposed on a second common carriage which is adjustable parallel to the saw blade transversely of the direction of movement of the first carriage.

An embodiment of the invention will be described in greater detail below, with reference to diagrammatic drawings, in which.

Figure 1:
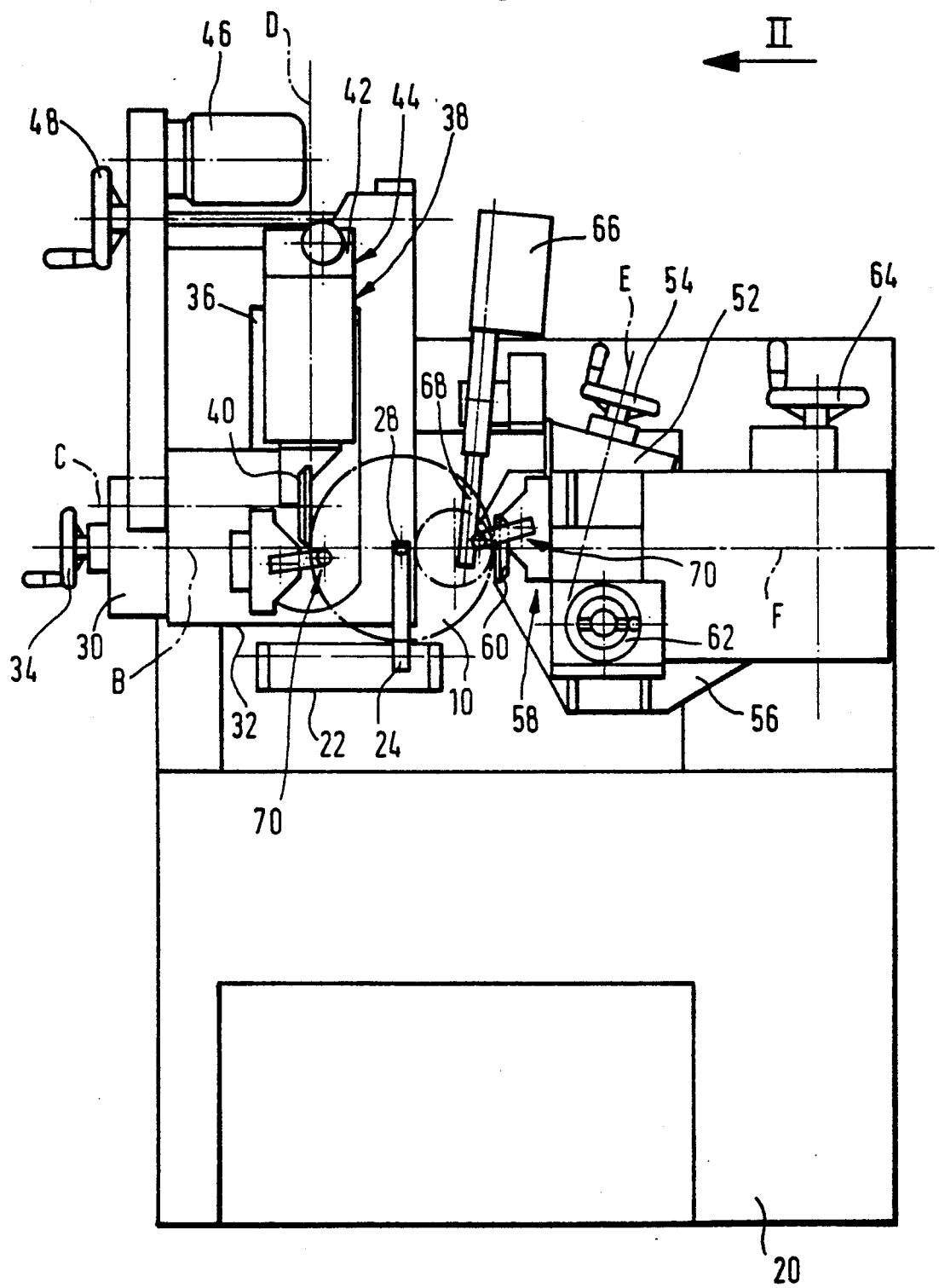
FIG. 1 is a front elevational view of a machine for finishing circular saw blades.
Figure 2:
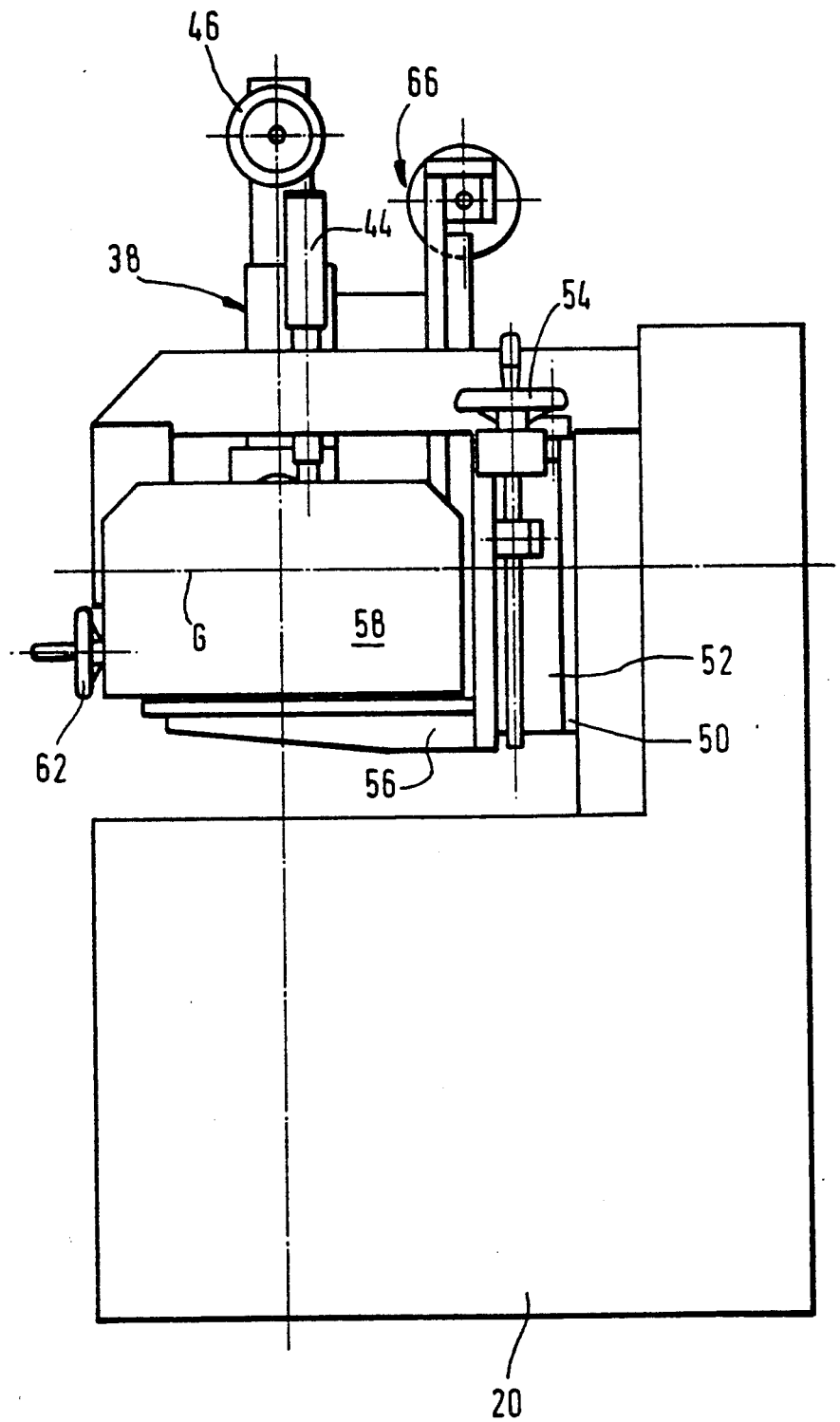
FIG. 2 is the lateral view in the direction of arrow II in FIG. 1.

The function of the machine illustrated is to subject the saw blades 10 of circular saws to stepwise machining, with a respective tooth 12 each intended to be ground at its tooth back 14 and a tooth 16 approximately diametrically opposite this one to be ground at both its tooth flanks 18.

The machine comprises a housing 20 with a lower horizontal guide member 22 on which a carriage 24 is guided so that it can be displaced and clamped manually. The carriage 24 supports a column 26 at the upper end of which a retainer member 28 is fixed which is embodied by a horizontal pin having a geometric axis A and projecting transversely of the guide member 22. The retainer member 28 serves for plugging on the saw blade 10 which is to be machined; the diameter of the saw blade determines the position in which the carriage 24 will be clamped.

The machine housing 20 further is formed with an upper horizontal guide member 30 on which a carriage 32 is adjustable by means of a hand wheel 34 along an axis B at right angles to the axis A. On the carriage 32 a guide member 36 is formed which is perpendicular in the position illustrated and along which a grinding device 38 can be moved up and down. The grinding device 38 comprises a grinding wheel 40 whose axis C extends parallel to the horizontal guide member 30 in the position illustrated. The grinding wheel 40 and its support are pivotable by means of a pivot drive 42 about an axis D extending in parallel with the guide member 36. The entire grinding device 38 can be raised and lowered along axis D by means of a piston and cylinder unit 44. A motor 46 is provided for driving of the grinding wheel 40. The direction of axis D with respect to the vertical can be adapted by means of a hand wheel 48 to the front clearance angle of the tooth backs 14 to be ground.

Horizontally spaced from the guide member 30, further to the right in FIG. 1, the machine housing 20 is formed with a guide member 50 whose geometric axis E extends perpendicular to the axis A and is inclined with respect to the vertical at an angle of 15° in the example shown. A carriage 52 is adjustable by means of a hand wheel 54 along the guide member 50.

The carriage 52 comprises a bracket 56 which carries a grinding device 58 with a pair of grinding wheels 60. The axes F of the grinding wheels 60 extend at an angle with respect to the saw blade 10, the angle being adjustable between 0° and 10° and corresponding to the desired front clearance angle at the tooth flanks 18. The spacing between the grinding wheels 60 can be adjusted by means of a hand wheel 62 in accordance with the thickness of the saw blade 10 to be machined. The grinding wheels 60 are supported on a tail spindle (not shown) and can be moved back and forth together with respect to the grinding device 58 along their axes F, such as by means of a common piston and cylinder unit.

The entire grinding device 58 is pivotable with respect to the bracket 56 about a horizontal axis G, parallel to the axis A, by means of another hand wheel 64. Hereby the grinding device 58 can be adapted to different cutting angles of the teeth 12 and 16 to be machined. The machine housing 20 further supports a feeder means of known structure, including a pawl 68 by means of which the saw blade 10 can be rotated stepwise such that one tooth 12 each will be located in the operating range of grinding device 38, while the opposite tooth 16 is in the operating range of grinding device 58.

Figure 3:
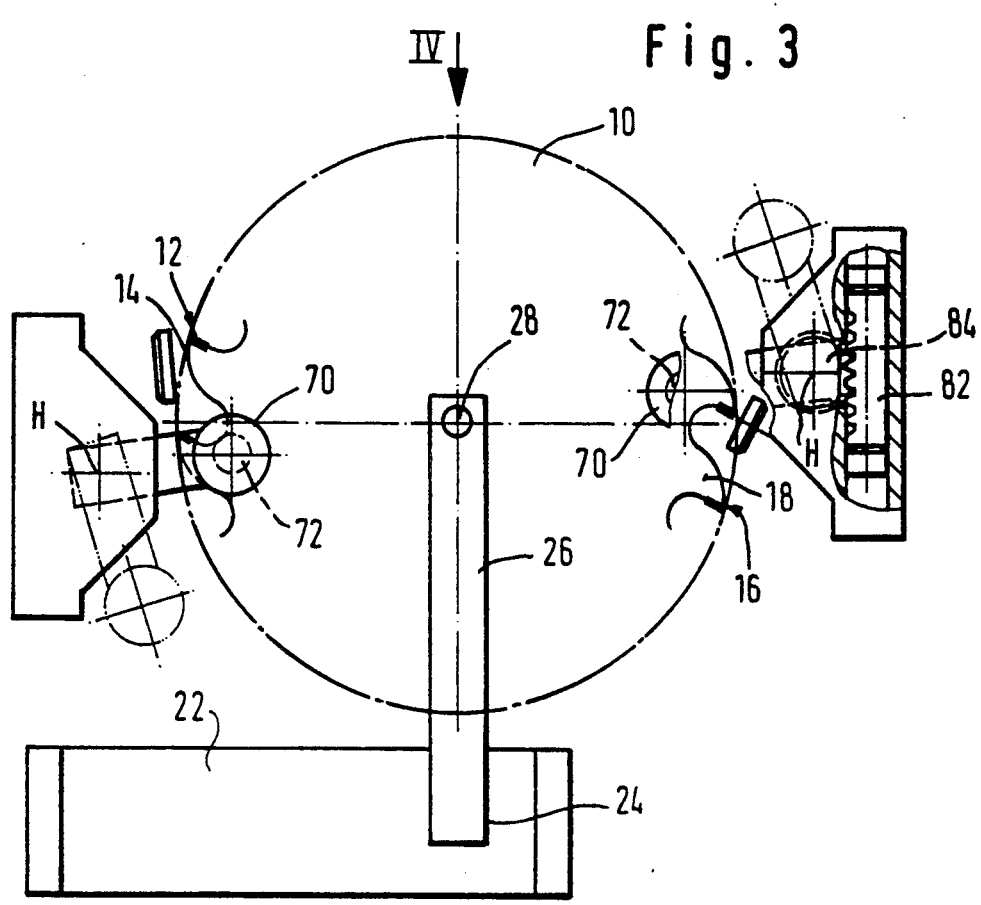
FIG. 3 is an enlarged cutout of FIG. 1, showing further details.
Figure 4:
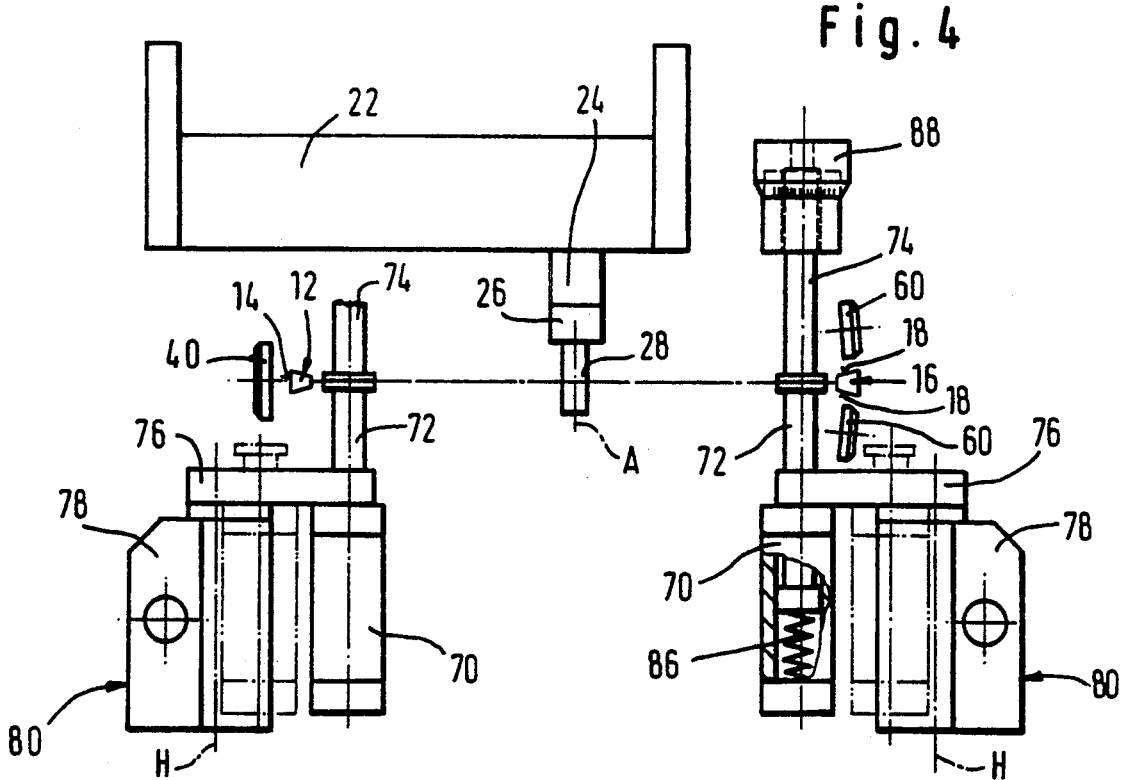
FIG. 4 is the corresponding top plan view in the direction of arrow IV in FIG. 3.

A clamping device 70 each is associated with both grinding devices 38 and 58, the clamping devices being adjustably secured to one each of the carriages 30 and 52. FIGS. 3 and 4 illustrate the two clamping devices 70 in full lines in an operative position and in dash-dot lines in an inoperative position. In each of these two positions the two clamping devices are diametrically opposed to each other; in the operative position, they are spaced from each other by a distance which is slightly smaller than the diameter of the saw blade 10, while their mutual spacing is clearly greater than this diameter in the inoperative position. Each of the clamping devices 70 includes an hydraulically operable plunger 72 which extends parallel to the axis A and, when in operative position, is opposed to a thrust bearing 74 in such a manner that the saw blade 10 can be clamped between each plunger 72 and the associated thrust bearing 74, specifically directly adjacent the respective tooth 12 or 16 which is to be ground.

Each of the clamping devices 70 is fastened at the end of an arm 76 supported in a casing 78 so as to be pivotable about an axis H. For each of the arms 76 there is a coordinated slewing device 80 embodied by a double-acting piston and cylinder unit which acts by way of a rack 82 and pinion 84 with which it is provided on a pinion 84 which is firmly connected to the corresponding arm 76.

As shown in FIG. 4, the plunger 72 of each of the two clamping devices 70 is biased by a spring 86 in the direction of the associated thrust bearing 74. Each of the thrust bearings 74 is adjustable by means of a micrometer screw 88 such that the saw blade 10 can be clamped in a predetermined position of its central plane, regardless of its thickness.

Figure 5:
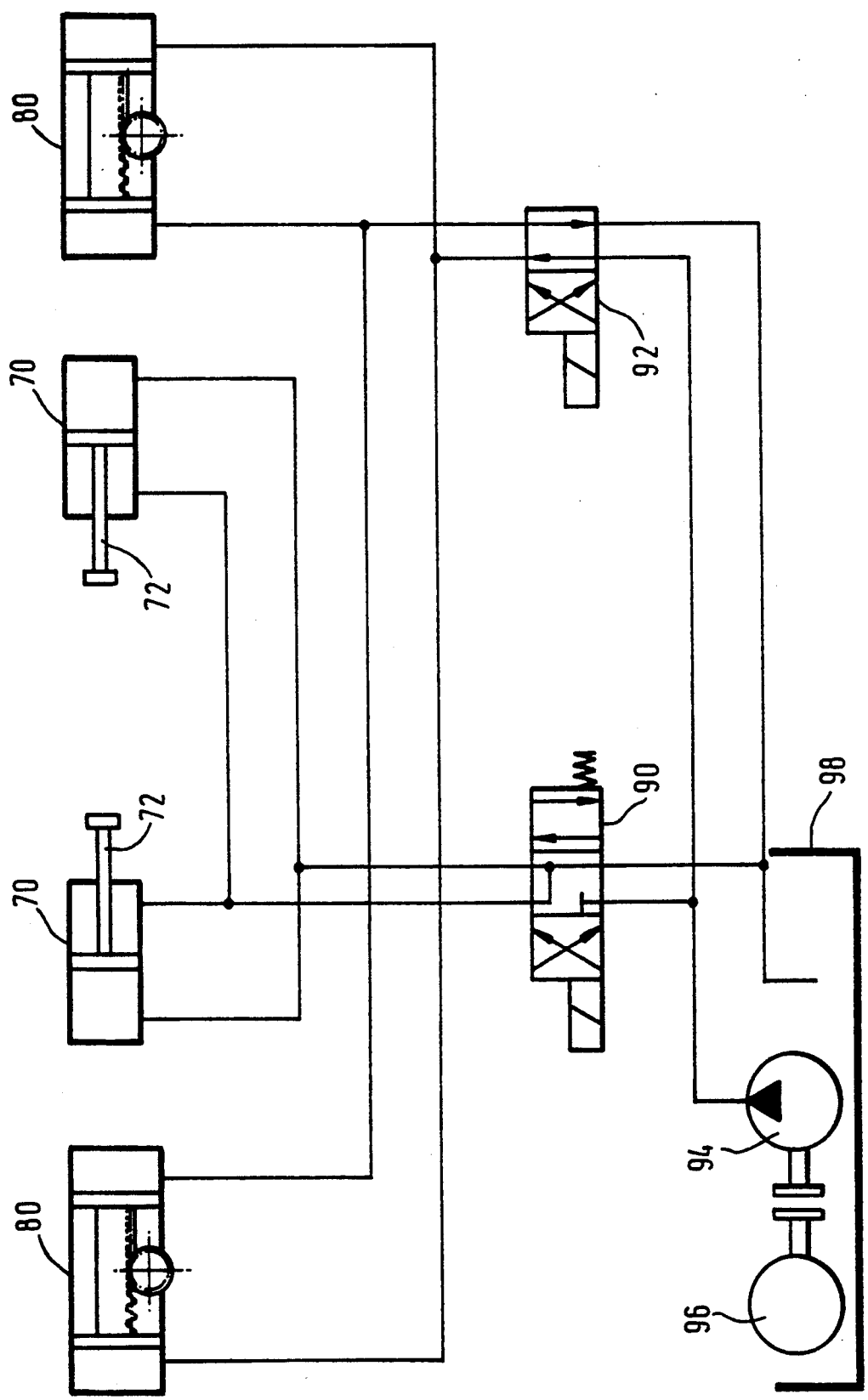
FIG. 5 is a circuit diagram including hydraulically operated devices of the machine.

According to FIG. 5, the two clamping devices 70 are designed as double-acting piston and cylinder units which are controlled by a common multi-way valve 90. The slewing devices 80, likewise embodied by double-acting piston and cylinder units, are controlled in corresponding manner by a common multi-way valve 92. The two multi-way valves 90 and 92 are fed by a pump 94 which is driven by a motor 96 and conveys hydraulic fluid from a reservoir 98.

What is claimed is:

1. A machine for finishing circular saw blades in multiple steps, comprising
    a retainer member (28) for a saw blade (10) to be plugged on,
    a means for clamping the saw blade (10),
    a two machining stations located diametrically opposite each other with respect to the retainer member (28) and designed for carrying out different operations on teeth (12, 16) of the saw blade (10),
    a feeder means adapted to rotate the saw blade (10) stepwise,
    a grinding device (38, 58) disposed at each of the two machining stations and controlled such that they each act simultaneously on a tooth (12, 16) of the saw blade (10),
    a clamping device (70) is disposed at each of the two stations and controlled such that they each simultaneously clamp the saw blade (10), respectively, before the grinding devices (38, 58) engage the saw blade (10),
    with one of the two grinding devices (38) and the associated clamping device (70) disposed on a first common carriage (32) whose distance from the diametrically opposed grinding device (58) with its associated clamping device (70) is variable in a diametral direction of the saw blade (10), and
    with the diametrically opposed grinding device (58) and its associated clamping device (70) disposed on a second common carriage (52) which is adjustable parallel to the saw blade (10) transversely of the direction of movement of the first carriage (32).

2. A machine for finishing circular saw blades in multiple steps, comprising
    a retainer means (28) for a saw blade (10) to be plugged on,
    a means for clamping the saw blade (10),
    two machining stations located diametrically opposite each other with respect to the retainer member (28) and designed for carrying out different operations on teeth (12, 16) of the saw blade (10),
    a feeder means (66) adapted to rotate the saw blade (10) stepwise,
    a grinding device (38, 58) disposed at each of the two machining stations and controlled such that they each act simultaneously on a tooth (12, 16) of the saw blade (10),
    a clamping device (70) is disposed at each of the two stations and controlled such that they each simultaneously clamp the saw blade (10), respectively, before the grinding devices (38, 58) engage the saw blade (10) and are movable from an operative position in which they are ready to clamp the saw blade (10) into an inoperative position in which the saw blade (10) can be slipped on or withdrawn from the retainer member (28) in axial direction,
    with one of the two grinding devices (38) and the associated clamping device (70) disposed on a first common carriage (32) whose distance from the diametrically opposed grinding device (58) with its associated clamping device (70) is variable in a diametral direction of the saw blade (10), and with the diametrically opposed grinding device (58) and its associated clamping device (70) disposed on a second common carriage (52) which is adjustable parallel to the saw blade (10) transversely of the direction of movement of the first carriage (32).

3. A machine for finishing circular saw blades in multiple steps, comprising a retainer means (28) for a saw blade (10) to be plugged on, a means for clamping the saw blade (10), two machining stations located diametrically opposite each other with respect to the retainer member (28) and designed for carrying out different operations on teeth (12, 16) of the saw blade (10), a feeder means (66) adapted to rotate the saw blade (10) stepwise, a grinding device (38, 58) disposed at each of the two machining stations and controlled such that they each act simultaneously on a tooth (12, 16) of the saw blade (10), a clamping device (70) is disposed at each of the two stations and controlled such that they each simultaneously clamp the saw blade (10), respectively, before the grinding devices (38, 58) engage the saw blade (10) and are movable from an operative position in which they are ready to clamp the saw blade (10) into an inoperative position in which the saw blade (10) can be slipped on or withdrawn from the retainer member (28) in axial direction and are each adapted to be swung back and forth parallel to themselves between their operative and inoperative positions by a slewing device (80), with one of the two grinding devices (38) and the associated clamping device (70) disposed on a first common carriage (32) whose distance from the diametrically opposed grinding device (58) with its associated clamping device (70) is variable in a diametral direction of the saw blade (10), and with the diametrically opposed grinding device (58) and its associated clamping device (70) disposed on a second common carriage (52) which is adjustable parallel to the saw blade (10) transversely of the direction of movement of the first carriage (32).

* * * * *

UNITED STATES PATENT AND TRADEMARK OFFICE
CERTIFICATE OF CORRECTION

PATENT NO. : 5,319,885

DATED : June 14, 1994

INVENTOR(S) : Ernst Beck et al.

It is certified that error appears in the above-identified patent and that said Letters Patent is hereby corrected as shown below:

In column 4, line 18, insert between the words "means" and "adapted" the numerals -- (66) --.

Signed and Sealed this

Twenty-fifth Day of October, 1994

Attest:

BRUCE LEHMAN

*Attesting Officer*   *Commissioner of Patents and Trademarks*